(12) United States Patent
Giardello et al.

(10) Patent No.: US 7,339,006 B2
(45) Date of Patent: Mar. 4, 2008

(54) METATHESIS-ACTIVE ADHESION AGENTS AND METHODS FOR ENHANCING POLYMER ADHESION TO SURFACES

(75) Inventors: Michael A. Giardello, Pasadena, CA (US); Christopher M. Haar, Pasadena, CA (US)

(73) Assignee: Cymetech, L.L.C., Monroe, LA (US)

( * ) Notice: Subject to any disclaimer, the term of this patent is extended or adjusted under 35 U.S.C. 154(b) by 788 days.

(21) Appl. No.: 10/178,373

(22) Filed: Jun. 24, 2002

(65) Prior Publication Data

US 2002/0153096 A1    Oct. 24, 2002

Related U.S. Application Data

(62) Division of application No. 09/497,741, filed on Feb. 4, 2000, now Pat. No. 6,409,875.

(60) Provisional application No. 60/118,864, filed on Feb. 5, 1999.

(51) Int. Cl.
*C08F 32/00*   (2006.01)
*C08F 36/00*   (2006.01)

(52) U.S. Cl. ............ 525/332.1; 526/171; 526/348; 526/280; 156/334; 428/420; 428/500

(58) Field of Classification Search ............ 525/332.1; 526/171, 348, 280; 156/334; 428/420, 500
See application file for complete search history.

(56) References Cited

U.S. PATENT DOCUMENTS

| | | | |
|---|---|---|---|
| 4,020,218 A * | 4/1977 | Ranney et al. | |
| 5,077,414 A | 12/1991 | Arduengo, III | 548/335 |
| 5,182,405 A | 1/1993 | Arduengo, III | 548/335.1 |
| 5,312,940 A | 5/1994 | Grubbs et al. | 556/136 |
| 5,342,909 A | 8/1994 | Grubbs et al. | 526/171 |
| 5,710,298 A | 1/1998 | Grubbs et al. | 556/22 |
| 5,728,785 A | 3/1998 | Grubbs et al. | 526/142 |
| 5,728,839 A | 3/1998 | Herrmann et al. | 548/103 |
| 5,728,917 A | 3/1998 | Grubbs et al. | 585/653 |
| 5,840,238 A | 11/1998 | Setiabudi et al. | 524/331.17 |
| 5,849,851 A | 12/1998 | Grubbs et al. | 526/93 |
| 5,880,231 A | 3/1999 | Grubbs et al. | 526/171 |
| 5,932,664 A | 8/1999 | Chen et al. | 525/338 |
| 5,936,100 A | 8/1999 | Fürstner et al. | 549/346 |
| 5,939,504 A | 8/1999 | Woodson et al. | 526/145 |
| 5,969,170 A | 10/1999 | Grubbs et al. | 556/21 |
| 6,001,909 A | 12/1999 | Setiabudi | 524/265 |
| 6,020,443 A | 2/2000 | Woodson et al. | 526/135 |
| 6,025,496 A | 2/2000 | Herrmann et al. | 548/107 |

FOREIGN PATENT DOCUMENTS

| | | |
|---|---|---|
| WO | WO 97/20865 | 6/1997 |
| WO | WO 97/29135 | 8/1997 |
| WO | WO 99/51344 | 10/1999 |
| WO | WO 00/15339 | 3/2000 |
| WO | WO 00/58322 | 10/2000 |
| WO | WO 00/71554 | 11/2000 |

OTHER PUBLICATIONS

RD 319027, Research Disclosure, Nov. 1990, No. 319.*
Huang, et al., "Olefin Metathesis-Active Ruthenium Complexes Bearing a Nucleophilic Carbene Ligand," JACS, Mar. 1999, pp. 121, 2674-2678.
Furstner, et al., "Cationic ruthenium allenylidene complexes as a new class of performing catalysts for ring closing metathesis," Chem. Commun., 1998, pp. 1315-1316.
Herrmann et al. "Nickel(II) Complexes of N-Heterocyclic Carbenes," Organometallics, 16, 2209-2212 (1997).
Herrmann et al. "N-Heterocyclic Carbenes," Angew Chem. Int. Ed. Engl., 36, 2162-2187 (1997).
Glander, et al. "Development and Application of Highly Efficient Ruthenium-Based Catalysts for the Ring Opening Metathesis Polymerization," Macromol. Symp. 127, 67-75 (1998).
Nolan, Steven P. "Synthetic, Thermochemical and Catalytic Studies of Ruthenium and Rhodium Complexes," Jun. 26, 1998.
Herrmann et al. "A Novel Class of Ruthenium Catalysts for Olefin Metathesis" Abstract: 11th International Symposium on Homogenous Catalysis, University of St. Andrews, Scotland U.K. Jul. 1998.
Herrmann, et al., "A Novel Class of Ruthenium Catalysts for Olefin Metathesis," Angewandte Chemie International Edition, 37, 18, 2490-2493 (Oct. 2, 1998).
Ackermann, et al. "Ruthenium Carbene Complexes with Imidazolin-2-ylidene Ligands Allow the Formation of Tetrasubstituted Cycloalkenes by RCM," Tetrahedron Letters, 40, 4787-4790 (1999).
Huang, et al. "Influence of Sterically Demanding Carbene Ligation on Catalytic Behavior and Thermal Stability of Ruthenium Olefin Metathesis Catalysts," Organometallics, 18, 5375-5380 (1999).
RD 343001, Research Disclosure, Nov. 1992, No. 343.

* cited by examiner

*Primary Examiner*—Kuo-Liang Peng
(74) *Attorney, Agent, or Firm*—David H. Jaffer; Pillsbury Winthrop Shaw Pittman LLP

(57) ABSTRACT

The invention discloses an adhesion agent composition comprising at least one $C_3$-$C_{200}$ olefin compound having at least one metathesis active double bond, wherein the olefin is substituted or unsubstituted; and at least one compatibilizing functionality for interacting with a substrate surface. The substrate surface can be any surface, for example, silicate glasses, silicate minerals, metals, metal alloys, ceramics, natural stones, plastics, carbon, silicon, and semiconductors. The invention also discloses articles of manufacture utilizing these adhesion agents as well as methods for adhering a polyolefin to a substrate surface.

15 Claims, No Drawings

METATHESIS-ACTIVE ADHESION AGENTS AND METHODS FOR ENHANCING POLYMER ADHESION TO SURFACES

This application claims the benefit of co-pending U.S. Provisional Patent Application Ser. No. 60/118,864, filed Feb. 5, 1999, the contents of which are incorporated herein by reference. The present application is a divisional of U.S. application Ser. No. 09/497,741 filed Feb. 4, 2000 (now U.S. Pat. No. 6,409,875 B1), entitled METATHESIS-ACTIVE ADHESION AGENTS AND METHODS FOR ENHANCING POLYMER ADHESIONS TO SURFACES by Michael A. Giardello and Christopher M. Haar, the content of which are incorporated herein by reference.

FIELD OF THE INVENTION

The invention is directed generally to novel adhesion agents that enhance the adhesion of polymers to various substrate surfaces. More specifically, the invention relates to novel adhesion agents that comprise olefin compounds having a metathesis-active double-bond and to methods for enhancing the surface adhesive properties of ring opening metathesis polymerized (ROMP) polymers using such adhesion agents.

BACKGROUND OF THE INVENTION

It is advantageous in many commercial applications to have strong adhesion between polymers (e.g., plastic resin coatings) and various substrate surfaces. Polymer coatings may be used, for example, to protect underlying surfaces from environmental and atmospheric conditions. In this manner, polymer coatings are useful in increasing the durability and extending the "life" of various surfaces, including glass optical fibers and mirrors. Adhesion is particularly important in high humidity and high temperature environments, where there is an increased risk of delaminating or "peeling" a polymer coating from a surface.

Various adhesion promoters have been used in an effort to improve the adhesive strength and durability of adhesion of polymers to surfaces. Silane coupling agents have been used to improve, for example, the adhesion of polymer coatings to glass optical fibers, the consolidation of fillers and reinforcements into a polymeric resin matrix, and the water repellency of ceramics. Certain of these common silane coupling agents are described in U.S. Pat. No. 5,527,835, issued Jun. 18, 1996 to Shustack; other embodiments of this principle were elucidated by Warner et al. (WO 99/11454), Setiabudi (U.S. Pat. No. 6,001,909), and Cagliostro et al. (*Journal of Advanced Materials* 1999, 31, 27-35). Commercially available organotitanate, aluminate, and -zirconate compounds such as those offered by Kenrich Petrochemicals, Inc. are also useful for improving the adhesion and compatibility of polymers with a wide variety of mineral, metallic, inorganic, rubber, and plastic resin fillers, reinforcements, and surfaces (see, for example, (a) Monte, S. J. and Sugerman, G., Kenrich Petrochemicals, Inc., "Ken-React® Reference Manual—Titanate, Zirconate, and Aluminate Coupling Agents." (Bulletin KR 0395), 227 pages, (Summer 1993—Second Revised Edition); (b) Monte, S. J. *Rubber Technology International* '96; (c) Dawson, B. *Rubber and Plastics News*, Sep. 21, 1998; (d) Monte, S. J. *Reinforced Plastics*, June 1996 and references therein) the disclosures of each of which are incorporated herein by reference.

It is known in the art to use organo-functional silanes to promote adhesion of polymer resins to glass surfaces. Organo-functional silane coupling agents used in the prior art include amino-functional silanes, acrylamido-functional silanes, allyl-functional silanes, vinyl-functional silanes, acrylate-functional silanes, methacrylate-functional silanes, and mercapto-functional silanes. Furthermore, academic and industrial researchers have for many years been investigating a variety of methods for applying thin organic films to a myriad of surfaces (see, for example: (a) Ullman, A. *An Introduction to Ultrathin Organic Films: From Langmuir-Blodgett to Self-Assembly*; Academic Press: San Diego, 1991; (b) Weck, M.; Jackiw, J. J.; Rossi, R. R.; Weiss, P. S.; Grubbs, R. H. *J Am. Chem. Soc.* 1999, 121, 4088-9; (c) Duchet, J.; Chapel, J. -P., Chabert, B.; Gerard, J. -F. *Macromolecules* 1998, 31, 8264-72; (d) Zhao, B.; Brittain, W. J.; Vogler, E. A. *Macromolecules* 1999, 32, 796-800; (e) Bateman, J. E.; Eagling, R. D.; Worrall, D. R.; Horrocks, B. R.; Houlton, A. *Angew. Chem. Int. Ed.* 1998, 37, 2683-5; (f) Effenberger, F.; Götz, G.; Bidlingmaier, B.; Wezstein, M. *Angew. Chem. Int. Ed.* 1998, 37, 2462-4; (g) O'Brien, S.; Keates, J. M.; Barlow, S.; Drewitt, M. J.; Payne, B. R.; O'Hare, D. *Chem. Mater.* 1998, 10, 4088-99; and references therein) the disclosures of which have appeared in the open literature and are incorporated herein by reference.

Polyolefin compositions, including polydicyclopentadiene (poly-DCPD), may be prepared using catalyzed olefin metathesis reactions such as, for example, ring opening metathesis polymerization (ROMP). Such olefin metathesis reactions and suitable metathesis catalysts (e.g., ruthenium- or osmium-based catalysts) have been previously described in, for example, U.S. Pat. Nos. 5,312,940, 5,342,909, 5,728, 917, 5,710,298, 5,831,108, and 6,001,909; PCT Publications WO 97/20865, WO 97/29135 and WO 99/51344; in U.S. Provisional Patent Application No. 60/142,713 filed Jul. 7, 1999 entitled "ROMP Reactions Using Imidazolidine-Based Metal Carbene Metathesis Catalysts;" and by Fürstner, Picquet, Bruneau, and Dixneuf in Chemical Communications, 1998, pages 1315-1316, the disclosures of each of which are incorporated herein by reference.

The aforementioned surface coupling agents, however, are not active in olefin ROMP reactions; rather, their efficacy as adhesion agents for ROMP polymers, such as poly-DCPD, is primarily the result of attractive London dispersion forces, also known as van der Waal's interactions, which are the weakest type of intermolecular forces. Thus, there exists a need for metathesis-active adhesion agents that provide enhanced adhesion of ROMP polyolefins to various substrate surfaces by covalently incorporating such adhesion agents into these ROMP polyolefins.

SUMMARY OF THE INVENTION

The invention relates to novel adhesion agents that comprise compounds having at least one metathesis-active double-bond. More specifically, the invention provides metathesis-active adhesion agent compositions and methods for enhancing the adhesive strength and durability of adhesion of polymers produced by metathesis to substrate surfaces.

The adhesion agents of the invention are useful for increasing the adhesion of various polyolefins to substrate surfaces including, but not limited to, silicate glasses and minerals, metals, metal alloys, ceramics, natural stones (e.g., marble and granite), plastics, carbon, silicon, and semiconductors. The adhesion agent compositions comprise olefin compounds having at least one metathesis-active double-bond, which is defined as a double bond active in olefin cross-metathesis reactions or in ring-opening metathesis reactions such as, for example, ROMP reactions.

In principle, any carbon-carbon double bond is capable of undergoing cross metathesis reactions in the presence of a suitable olefin metathesis catalyst. Similarly, any cyclic olefin is capable of undergoing ring-opening by olefin metathesis. Accordingly, for example, when contacted with resins comprising dicyclopentadiene (DCPD) or other cyclic olefin in the presence of suitable ruthenium or osmium catalysts, the metathesis-active adhesion agents of the invention are covalently incorporated into the bulk polymer backbone and thereby provide enhanced adhesion of the ring-opened polyolefin polymer to the substrate surface.

The metathesis-active adhesion agents taught in the invention comprise compounds having at least one metathesis-active double bond and at least one compatiblizing functionality capable of an attractive interaction with functional groups present at the (native or functionalized) substrate surface. Particularly preferred metathesis-active olefinic moieties include norbornenes, cyclopropenes, cyclobutenes, or other cyclic olefins. Particularly preferred compatiblizing functionalities include, for example, metal or silyl halides, ethers, and alkoxides for hydroxylated surfaces; acidic groups (e.g., carboxylic and mineral acids, boranes, alanes, and the like) for basic surfaces; basic groups (e.g., alkoxides, amines, phosphines, phosphine oxides, carboxylates, ethers, thioethers, and the like) for acidic surfaces; amphoteric groups such as alcohols; and ionic groups, including ammonium, phosphonium, sulfonate, and conjugate ions of the weak acids and bases mentioned above, for ionic surfaces.

One aspect of the invention is a novel metathesis-active adhesion agent. Another aspect of the invention is a method for enhancing adhesion of polyolefins to substrate surfaces through the use of such adhesion agents. A further aspect of the invention is an article of manufacture, such as a molded part, comprising a polyolefin adhered to a substrate surface using a metathesis-active adhesion agent of the invention. These and other aspects of the invention will be apparent to one skilled in the art in light of the following detailed description of the preferred embodiments.

DETAILED DESCRIPTION OF THE PREFERRED EMBODIMENTS

The invention is directed to adhesion agents comprising olefin compounds having at least one metathesis-active double-bond. In certain preferred embodiments, the invention provides metathesis-active adhesion agent compositions, as well as methods for enhancing the adhesive strength and durability of adhesion of polymers produced by metathesis to substrate surfaces.

The metathesis-active adhesion agent compositions of the invention comprise compounds having at least one metathesis-active double-bond and at least one compatiblizing functionality capable of interacting attractively with functional groups present at the substrate surface. These adhesion agents provide enhanced adhesion of a ring-opened polyolefin polymer to an underlying substrate surface through the covalent incorporation of the metathesis-active moiety into the bulk ROMP polymer while the compatiblizing functionality remains firmly bound to the substrate surface. In preferred embodiments, the adhesion agents, when contacted with resins comprising dicyclopentadiene (DCPD) or other cyclic olefin in the presence of a suitable ruthenium or osmium catalyst, provide enhanced adhesion of the polyolefin polymer to the substrate surface.

In certain embodiments, the metathesis-active adhesion agents of the invention contain olefinic groups having metathesis-active double-bonds, thereby providing complementary functionality between the bulk polyolefin and the underlying substrate surface. Metathesis-active olefinic moieties include any terminal or internal, mono-, di-, or trisubstituted olefins and any cycloalkene with at least three carbon atoms. Preferably, metathesis-active olefinic moieties include mono-or disubstituted olefins and cycloolefins containing between 3 and 200 carbons. Most preferably, metathesis-active olefinic moieties include cyclic or multicyclic olefins, such as cyclopropenes, cyclobutenes, cycloheptenes, cyclooctenes, cyclooctadienes (COD), norbornenes, norbonadienes, [2.2.1]bicycloheptenes, [2.2.2]bicyclooctenes, benzocyclobutenes, cyclopentenes, cyclopentadiene oligomers including trimers, tetramers, pentamers, and the like; cyclohexenes, cyclohexenylnorbornenes, norbornene dicarboxylic anhydrides (nadic anhydrides), and substituted norbornenes including butyl norbornene, hexyl norbornene, octyl norbornene, decyl norbornene, and the like. A preferred olefin monomer for use in the invention is dicyclopentadiene (DCPD). It is also understood that such compositions include frameworks in which one or more of the carbon atoms carry substituents derived from radical fragments including halogens, pseudohalogens, alkyl, aryl, acyl, carboxyl, alkoxy, alkyl- and arylthiolate, amino, aminoalkyl, and the like, or in which one or more carbon atoms have been replaced by, for example, silicon, oxygen, sulfur, nitrogen, phosphorus, antimony, or boron. For example, the olefin may be substituted with one or more groups such as thiol, thioether, ketone, aldehyde, ester, ether, amine, amide, nitro, carboxylic acid, disulfide, carbonate, isocyanate, phosphate, phosphite, sulfate, sulfite, sulfonyl, carboiimide, carboalkoxy, carbamate, halogen, or pseudohalogen. Similarly, the olefin may be substituted with one or more groups such as $C_1$-$C_{20}$ alkyl, aryl, acyl, $C_1$-$C_{20}$ alkoxide, aryloxide, $C_3$-$C_{20}$ alkyldiketonate, aryldiketonate, $C_1$-$C_{20}$ carboxylate, arylsulfonate, $C_1$-$C_{20}$ alkylsulfonate, $C_1$-$C_{20}$ alkylthio, arylthio, $C_1$-$C_{20}$ alkylsulfonyl, and $C_1$-$C_{20}$ alkylsulfinyl, $C_1$-$C_{20}$ alkylphosphate, arylphosphate, wherein the moiety may be substituted or unsubstituted.

An exemplary aspect of the invention is that metathesis-active adhesion agents for any surface composition can be designed based on the principles taught herein. Those skilled in the art understand that the surface chemistry of a particular composition dictates the chemical andlor physical processes and reactions required to bond to said surface: For example, preferred adhesion agents for glass, silicon, or other hydroxylated surface compositions comprise compounds prepared by contacting silicon tetrachloride ($SiCl_4$) or silyl ethers with nucleophilic reagents including water, alcohols, amines, amides, phosphines, phosphides, carbanions, and alkoxides where the proportion of nucleophile to silicon in such reactions is between about 1:1 and about 3:1 parts by mole. For example, a particularly preferred adhesion agent is prepared by the reaction of $SiCl_4$ under anhydrous conditions with 0.25 equivalent of 5-norbomene-2-methanol in the presence of a proton scavenger such as triethylamine. Preferred adhesion agents for a gold surface, on the other hand, are most appropriately functionalized with thiol-containing compounds, whereas preferred agents for carbon black or titanium dioxide include titanates and zirconates. One preferred adhesion agent composition is using a norbomene where the compatibilizing functionality is of the formula —$SiCl_x(ER_y)_{3-x}$, wherein x is in the range of 0 to 3; y is in the range of 1 to 3; E may be carbon, silicon, nitrogen, phosphorus, antimony, or oxygen; and R is an alkyl or aryl and may be substituted or unsubstituted. A particularly preferred composition is where the olefin is 5-norbomene-2-methoxy, x is 0 or 3, y is 1; E is oxygen, and R is methyl or ethyl.

Particularly preferred compatiblizing functionalities will therefore be chosen based upon on the exact nature of the surface to be modified and include, for example, metal and silyl halides, ethers, and alkoxides for hydroxylated surfaces; substituted or unsubstituted olefins such as $C_3$-$C_{20}$ terminal olefins, or aldehydes for silicon surfaces, acidic groups (e.g., carboxylic and mineral acids, boranes, alanes, and the like) for basic surfaces; basic groups (e.g., alkoxides, amines, phosphines, phosphine oxides, carboxylates, ethers, thioethers, and the like) for acidic surfaces; amphoteric groups such as alcohols; and ionic groups, including ammonium, phosphonium, sulfonate, sulfonyls, and conjugate ions of the weak acids and bases mentioned above, for ionic surfaces; alkyl and aryl phosphine oxides; organotitante, -aluminate, and -zirconate groups have proven effective for many of the above mentioned surfaces, including fiberglass and woven glass; inorganic fillers such as carbonates, alumina trihydrate, rutile; carbon black, rubber particles, and carbon and polymeric fibers and fabrics. A particularly preferred compatibilizing functionality is a silsesquioxane.

The metathesis-active adhesion agents taught in the invention may be formulated for use with any of a variety of substrate surfaces including, but not limited to, silicate, glasses, metals, metal alloys, ceramics, natural stones (e.g., marble and granite), and plastics. Substrate surface refers not only to an uncoated substrate but also to a coated surface, such as, for example a glass substrate coated with metal. It is unnecessary that the substrate surface be smooth, flat, or non-porous for the practice of the invention. For example, fibrous surfaces, woven surfaces, microparticulate surfaces, glass surfaces, ceramic surfaces, metal surfaces, carbon surfaces, and polymer surfaces may be utilized in connection with the invention, in addition to substantially large, flat, regular, or monolithic articles. The invention may also be used in conjunction with variable density polyolefin compositions that provide, for example, a substrate or coated surface. Such variable density polyolefin compositions have been described in for example, U.S. Provisional Patent Application Ser. No. 60/118,865 filed Feb. 5, 1999 and U.S. patent application Ser. No. 09/497,950, filed Feb. 4, 2000, now U.S. Pat. No. 6,525,125 issued Feb. 25, 2003, entitled "Polyolefin Compositions Having Variable Density and Methods for Their Production and Use," the contents of each of which are incorporated herein by reference.

The adhesion agents of the invention may be used to functionalized the native substrate surface prior to metathesis polymerization, or included as a component in the polymerizable resin composition, or both. In other words, the adhesion agent may be applied to or contacted with the substrate surface to functionalize (i.e., pre-treat) the surface prior to application of the resin to the surface. In this manner, the surface is provided with functional groups that are complementary to those contained in the applied polymer resin. The adhesion agent may be alternatively or additionally included in the resin formulation to be applied to the substrate, with the exception of adhesion agents containing terminal alkyl, amine, vinyl ether, thiol, and certain other functions known in the art to inhibit polymerization at higher than interfacial concentrations.

In the invention, the adhesive interaction between the native or pre-treated substrate surface and the bulk ring-opened polymer may be ionic/electrostatic, nonionic, and/or covalent in nature. The complementary functionalities provided by the adhesion agents of the invention provide "anchors" between the substrate surface and the bulk polyolefin that result in enhanced adhesive strength over silane, zirconate, titanate, aluminate and other conventional, non-metathesis-active coupling agents.

The polyolefin compositions or resins may be prepared using one or more monomers such as dicyclopentadiene, cyclopropene, cyclobutene, benzocyclobutene, cyclopentene, cyclopentadiene oligomers including trimers, tetramers, pentamers, and the like, cyclohexene, cycloheptene, cyclooctene, cycooctadiene, unsubstituted norbornenes, substituted norbornenes such as butyl norbornene, hexyl norbornene, octyl norbornene, decyl norbornene, and the like; cyclohexenylnorbornene, norbornene dicarboxylic anhydride (nadic anhydride), norbornadiene, [2.2.1]bicycloheptene, and [2.2.2]bicyclooctene. These olefin monomers may be used alone or mixed with each other in various combinations to adjust the properties of the olefin monomer composition. For example, mixtures of cyclopentadiene dimer and trimers offer a reduced melting point and yield cured olefin copolymers with increased mechanical strength and stiffness relative to pure poly-DCPD. As another example, incorporation of COD, norbornene, or alkyl norbornene comonomers tend to yield cured olefin copolymers that are relatively soft and rubbery. A preferred olefin monomer for use in the invention is dicyclopentadiene (DCPD). In addition, the resin may be substituted or unsubstituted. In polyolefin resins that are substituted, the substitution may be any moiety such as thiol, thioether, ketone, aldehyde, ester, ether, amine, amide, nitro, carboxylic acid, disulfide, carbonate, isocyanate, carboiimide, carboalkoxy, carbamate, halogen, and psuedohalogen. Similarly, the polyolefin resin may be substitituted with a moiety such as $C_1$-$C_{20}$ alkyl, aryl, acyl, $C_1$-$C_{20}$ alkoxide, aryloxide, $C_3$-$C_{20}$ alkyldiketonate, aryldiketonate, $C_1$-$C_{20}$ carboxylate, arylsulfonate, $C_1$-$C_{20}$ alkylsulfonate, $C_1$-$C_{20}$ alkylthio, arylthio, $C_1$-$C_{20}$ alkylsulfonyl, and $C_1$-$C_{20}$ alkylsulfinyl, wherein the moiety may be substituted or unsubstituted.

The polyolefin compositions for use with the invention may be prepared by any standard method for the ring-opening metathesis of olefin monomers (e.g., DCPD) using a metal carbene metathesis catalyst system. Ruthenium and osmium carbene compounds have been identified as particularly effective catalysts for ROMP reactions. Exemplary olefin metathesis reactions and suitable metathesis catalysts are described in, for example, U.S. Pat. Nos. 5,312,940, 5,342,909, 5,728,917, 5,710,298, 5,831,108, and 6,001,909; PCT Publications WO 97/20865, WO 97/29135 and WO 99/51344; in U.S. Provisional Patent Application No. 60/142,713 filed Jul. 7, 1999 entitled "ROMP Reactions Using Imidazolidine-Based Metal Carbene Metathesis Catalysts;" and by Fürstner, Picquet, Bruneau, and Dixneuf in Chemical Communications, 1998, pages 1315-1316, the disclosures of each of which are incorporated herein by reference.

Any suitable metathesis catalyst may be used. Illustrative examples of suitable catalysts include ruthenium and osmium carbene catalysts as disclosed by U.S. Pat. Nos. 5,342,909; 5,312,940; 5,728,917; 5,750,815; 5,710,298, 5,831,108, and 5,728,785, all of which are incorporated herein by reference. Briefly, the ruthenium and osmium carbene catalysts possess metal centers that are formally in the +2 oxidation state, have an electron count of 16, are penta-coordinated, and are of the general formula

wherein:

M is ruthenium or osmium;

X and $X^1$ are each independently any anionic ligand;

L and $L^1$ are each independently any neutral electron donor ligand;

R and $R^1$ are each independently hydrogen or a substituent selected from the group consisting of $C_1$-$C_{20}$ alkyl, $C_2$-$C_{20}$ alkenyl, $C_2$-$C_{20}$ alkynyl, aryl, $C_1$-$C_{20}$ carboxylate, $C_1$-$C_{20}$ alkoxy, $C_2$-$C_{20}$ alkenyloxy, $C_2$-$C_{20}$ alkynyloxy, aryloxy, $C_2$-$C_{20}$ alkoxycarbonyl, $C_1$-$C_{20}$ alkylthio, $C_1$-$C_{20}$ alkylsulfonyl and $C_1$-$C_{20}$ alkylsulfinyl. Optionally, each of the R or $R^1$ substituent group may be substituted with one or more moieties selected from the group consisting of $C_1$-$C_{10}$ alkyl, $C_1$-$C_{10}$ alkoxy, and aryl which in turn may each be further substituted with one or more groups selected from a halogen, a $C_1$-$C_5$ alkyl, $C_1$-$C_5$ alkoxy, and phenyl. Moreover, any of the catalyst ligands may further include one or more functional groups. Examples of suitable functional groups include but are not limited to: hydroxyl, thiol, thioether, ketone, aldehyde, ester, ether, amine, imine, amide, nitro, carboxylic acid, disulfide, carbonate, isocyanate, carbodiimide, carboalkoxy, carbamate, and halogen.

In preferred embodiments of these catalysts, the R substituent is hydrogen and the $R^1$ substituent is selected from the group consisting $C_1$-$C_{20}$ alkyl, $C_2$-$C_{20}$ alkenyl, and aryl. In even more preferred embodiments, the $R^1$ substituent is phenyl or vinyl, optionally substituted with one or more moieties selected from the group consisting of $C_1$-$C_5$ alkyl, $C_1$-$C_5$ alkoxy, phenyl, and a functional group. In especially preferred embodiments, $R^1$ is phenyl or vinyl substituted with one or more moieties selected from the group consisting of chloride, bromide, iodide, fluoride, —$NO_2$, —$NMe_2$, methyl, methoxy and phenyl. In the most preferred embodiments, the $R^1$ substituent is phenyl.

In preferred embodiments of these catalysts, L and $L^1$ are each independently selected from the group consisting of phosphine, sulfonated phosphine, phosphite, phosphinite, phosphonite, arsine, stibine, ether, amine, amide, imine, sulfoxide, carboxyl, nitrosyl, pyridine, and thioether. In more preferred embodiments, L and $L^1$ are each a phosphine of the formula $PR^3R^4R^5$, where $R^3$, $R^4$, and $R^5$ are each independently aryl or $C_1$-$C_{10}$ alkyl, particularly primary alkyl, secondary alkyl or cycloalkyl. In the most preferred embodiments, L and $L^1$ ligands are each selected from the group consisting of —$P(cyclohexyl)_3$, —$P(cyclopentyl)_3$, —$P(isopropyl)_3$, and —$P(phenyl)_3$. Another preferred embodiment of the catalyst is where L is any neutral electron donor and $L^1$ is an imidazolidine ligand. In certain embodiments, $L^1$ may have the general formula

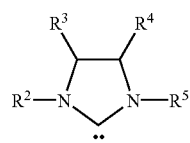

wherein:

$R^2$, $R^3$, $R^4$, and $R^5$ are each independently hydrogen or a substituent selected from the group consisting of $C_1$-$C_{20}$ alkyl, $C_2$-$C_{20}$ alkenyl, $C_2$-$C_{20}$ alkynyl, aryl, $C_1$-$C_{20}$ carboxylate, $C_1$-$C_{20}$ alkoxy, $C_2$-$C_{20}$ alkenyloxy, $C_2$-$C_{20}$ alkynyloxy, aryloxy, $C_2$-$C_{20}$ alkoxycarbonyl, $C_1$-$C_{20}$ alkylthio, $C_1$-$C_{20}$ alkylsulfonyl and $C_1$-$C_{20}$ alkylsulfinyl. $R^3$ and $R^4$ may also together form a cycloalkyl or an aryl moiety. A preferred embodiment is where $R^3$ and $R^4$ are both hydrogen or phenyl and $R^2$ and $R^5$ are each independently substituted or unsubstituted aryl. In addition, L and $L^1$ together may comprise a bidentate ligand.

In preferred embodiments of these catalysts, X and $X^1$ are each independently hydrogen, halide, or one of the following groups: $C_1$-$C_{20}$ alkyl, aryl, $C_1$-$C_{20}$ alkoxide, aryloxide, $C_3$-$C_{20}$ alkyldiketonate, aryldiketonate, $C_1$-$C_{20}$ carboxylate, arylsulfonate, $C_1$-$C_{20}$ alkylsulfonate, $C_1$-$C_{20}$ alkylthio, $C_1$-$C_{20}$ alkylsulfonyl, or $C_1$-$C_{20}$ alkylsulfinyl. Optionally, X and $X^1$ may be substituted with one or more moieties selected from the group consisting of $C_1$-$C_{10}$ alkyl, $C_1$-$C_{10}$ alkoxy, and aryl which in turn may each be further substituted with one or more groups selected from halogen, $C_1$-$C_5$ alkyl, $C_1$-$C_5$ alkoxy, and phenyl. In more preferred embodiments, X and $X^1$ are halide, benzoate, $C_1$-$C_5$ carboxylate, $C_1$-$C_5$ alkyl, phenoxy, $C_1$-$C_5$ alkoxy, $C_1$-$C_5$ alkylthio, aryl, and $C_1$-$C_5$ alkyl sulfonate. In even more preferred embodiments, X and $X^1$ are each halide, $CF_3CO_2$, $CH_3CO_2$, $CFH_2CO_2$, $(CH_3)_3CO$, $(CF_3)_2(CH_3)CO$, $(CF_3)(CH_3)_2CO$, PhO, MeO, EtO, tosylate, mesylate, or trifluoromethanesulfonate. In the most preferred embodiments, X and $X^1$ are each chloride. In addition, X and $X^1$ together may comprise a bidentate ligand.

Other additives and ingredients may be included in the resin formulations used in conjunction with the invention. Typical additives and reinforcements known in the art include, for example, antioxidants and stabilizers, flame retardants, dyes, pigments, fibers and fillers.

The invention is also directed to articles of manufacture, such as a molded part, comprising at least one polyolefin resin, at least one substrate surface, and at least one adhesion agent. Furthermore, the compositions and articles of manufacture of the invention are not limited to a single polymer-surface interface but include also multilayers and laminates containing multiple polymer-surface interfaces, i.e., multilayer laminate articles can be assembled from different layers of similar or dissimilar materials. Such articles have found use in the production of, for example, ballistic panels, "bullet proof" glass, armor, and composite structural members. An example of such a laminate structure would be layers of metal, glass, ceramic, and plastic incorporated into a single article using ROMP polyolefin compositions and metathesis-active adhesion agents as adhesives or glues between each layer.

A particular advantage of the invention is the ability to choose adhesion agents appropriate for each surface. In this way, an unlimited number of different layers, each of a different composition, can be consolidated into a single article using a single ROMP polyolefin composition as "glue" between each layer. Additionally or alternatively, more than one ROMP polyolefin can be used in such multilayer articles, as in, for example, a metal-glass-plastic article wherein the ROMP polyolefin between the metal and glass layers is stiff and strong, while that between the glass and plastic layers is soft and rubbery.

Polyolefin coatings permitted by the invention can also serve the purpose of protecting or sealing the articles to which they are applied, such as in articles and applications including, for example, water- and weatherproofing, ablative and other sacrificial coatings, lithographic or other masks, and applications wherein the seal between two surfaces must be impermeable to inert or reactive gases and liquids.

For the purposes of clarity, the specific details of the invention will be illustrated with reference to especially preferred embodiments. However, it should be appreciated that these embodiments and examples are for the purposes of illustration only and are not intended to limit the scope of the invention.

EXAMPLES

Example 1

Preparation of Norbornene-Based Adhesion Agent

A 100 ml Schlenk tube equipped with a magnetic stirring bar was charged with $SiCl_4$ (Aldrich, 50 ml of 1.0 M solution in $CH_2Cl_2$), followed by addition of 8 ml of $NEt_3$. To the stirred $SiCl_4$ solution was slowly added 6 ml of 5-norbornene-2-methanol (Aldrich), evolving heat and a copious amount of white precipitate. After the addition of the 5-norbornene-2-methanol was complete, the reaction was allowed to stir at room temperature overnight. Cannula filtration of the pale yellow reaction mixture yielded a yellow $CH_2Cl_2$ solution of the norbornene-functionalized adhesion agent.

Example 2

Adhesion of Poly-DCPD to Octyltriethoxysilane (OTES)-Treated Glass Surface

A visually clean piece of plate glass was treated by pouring 5 mL neat OTES onto the substrate and allowing the liquid to stand for 15 h. The remaining liquid was wiped away and the substrate was placed in a 40° C. oven. An activated DCPD resin at 40° C.—comprising dicyclopentadiene (BF Goodrich Ultrene 99), Ethanox 702 (Albemarle), triphenylphosphine (Strem), and metathesis catalyst dichloro(dimethylvinylmethylidine)bis(tricyclopentylphosphine) ruthenium in the proportions 1000:30:1:1 parts by weight, respectively—was poured onto the treated glass and subjected to a cure cycle of 1 h at 40° C., 2 h at ambient, 1 h at 140° C. The hardened DCPD resin could easily be removed from the substrate by hand, indicating weak adhesion.

Example 3

Adhesion of Poly-DCPD to Metathesis-Active Allyltriethoxysilane (ATES)-Treated Glass Surface The procedure of Example 2 was repeated except 5 mL neat ATES was used to treat the glass substrate. When attempting to remove the hardened DCPD resin from the glass surface, areas of cohesive failure were observed in the glass substrate.

Example 4

Adhesion of Poly-DCPD to Norbornene-Based, Metathesis-Active Silane-Treated Glass Surface A 6"×6" panel of plate glass was cleaned with Windex™ (Johnson Wax), rinsed with acetone, and allowed to air dry. A 1 ml aliquot of the adhesion agent prepared in Example 1 was drawn into a syringe and dispensed directly onto the clean glass surface, resulting in copious evolution of gaseous HCl. The solution was allowed to dry on the glass surface, yielding a colorless, gelatinous film. The functionalized surface was then repeatedly washed with portions of toluene, acetone, and water, followed by a final rinse with acetone. The functionalized glass plate was assembled into a mold with an untreated glass panel and the mold was then heated to 40° C.

The mold was then filled with poly-DCPD resin prepared by stirring in a flask: 92 g of DCPD monomer and 2.8 g of Ethanox 702 antioxidant. This mixture was stirred and heated to 35° C., and 0.09 g of triphenylphosphine ($PPh_3$, or TPP) and 0.1 g of dimethylvinylmethylidenebis(tricyclopentylphosphine)ruthenium dichloride catalyst were added. The resulting resin was cured at 40° C. for 30 minutes.

The mold was allowed to cool to ambient temperature for 2 hours and then was subjected to a 1 hour post-cure at 130° C. After post-cure, the untreated glass panel was easily removed while the molded plaque was still cooling. As the poly-DCPD plaque cooled and shrank, the strain introduced by adhesion of the polymer to the functionalized surface resulted in catastrophic cohesive failure within the treated glass substrate. Examination revealed that several large scallops of glass had been torn from the glass panel and remained firmly adhered to the surface of the polymer plaque.

Example 5

Adhesion of Poly-DCPD to Gold-Coated Glass Surface Treated with an Ionic, Norbornene-Based, Metathesis-Active Coupling Agent A glass slide coated on only one side with gold metal is immersed for one minute in a solution of 2-dimethylaminoethanethiol hydrochloride (Aldrich, 0.1 g in 100 ml of water), rinsed with clean water, then immersed in an ambient temperature solution of sodium 5-norbornene-2-carboxylate (0.1 g in a 1:1 (by volume) ethanol/water mixture), which is prepared by the neutralization of 5-norbornene-2-carboxylic acid with one equivalent of aqueous hydroxide ion. The temperature of the solution is then raised to 50° C. and the slide is allowed to soak at this temperature for 12 hours. After cooling to ambient temperature, the functionalized glass slide is removed from the carboxylate solution and allowed to air dry at 40° C. The functionalized glass slide is then immersed for 30-60 seconds in a freshly prepared poly-DCPD resin, prepared as in Example 2 above. The slide is removed from the poly-DCPD resin and subjected to the cure cycle as in Example 2. The poly-DCPD resin covering the unfunctionalized, non-gold coated side of the slide is easily peeled from the surface by hand, but the resin adhering to the functionalized gold-coated side requires physical scraping in order to remove the polymer from the surface.

Example 6

Poly-DCPD Safety Coating for an Untreated Glass Bottle

A poly-DCPD resin prepared as in Example 2 is maintained at 40° C. A 250 mL clear glass Boston bottle is heated to 80° C. in an oven and then dipped repeatedly into the thickening poly-DCPD resin until a persistent coating of gelled resin is apparent on the bottle. The coated bottle is allowed to cure for 1 h at 40° C., 2 h at ambient, and 1 h at 140° C. After cooling from the post cure, the cured DCPD resin on the bottle is loose and has shrunk away from the glass surface.

Example 7

Poly-DCPD Protective Coating for a Glass Bottle Treated with Norbornene-Based Metathesis-Active Coupling Agent A bottle as in Example 6 except that the exterior of the bottle is first treated as follows: A norbornene-based coupling agent is prepared from 5-norbornene-2-methanol and chlorotriethoxysilane according to the procedure in Example 1. The dry bottle is dipped into this solution, rinsed with toluene and acetone, then air dried. After post-cure and cooling, the poly-DCPD coating is firmly affixed to the bottle and must be cut or sliced to be removed.

Example 8

Addition of Cross-Metathesis Active Coupling Agent ATES to Bulk Poly-DCPD Resin

An activated poly-DCPD resin was prepared as in Example 2 with the addition of 5 parts ATES per hundred parts DCPD. This resin was then poured onto a visually clean piece of plate glass and placed in a 40° C. oven to cure. After 3 h, the poly-DCPD resin had still not cured, as determined by the tacky softness of the sample and the strong smell of unpolymerized dicyclopentadiene.

Example 9

Poly-DCPD Composite Panel with Volan-Sized Fabric

A preform consisting of 20 layers of Volan-sized 7781 E-Glass fabric was dried at 120° C. for at least 2 h, cooled to 40° C., then impregnated with a DCPD resin prepared as in Example 2. The interlaminar shear strength—often used as a test of fiber-matrix adhesion—of this composite article was found to be 2,198±84 psi as measured by the short-beam shear test (ASTM-D-2344).

Example 10

Poly-DCPD Composite Panel with Metathesis-Active ATES-Treated Volan-Sized Fabric A composite panel as in Example 9, except the oven-dried Volan-sized glass fabric was subjected to the following pre-treatment: A solution of 10 g ATES was prepared in 100 g toluene. Each ply of the preform was soaked in this solution for approximately 30 s, then stacked neatly in a second pan. The remaining solution was then poured over the stacked plies and the preform allowed to stand in this liquid for ca. 15 h. The preform was then dried in a 40° C. oven for 24 h before infusing with poly-DCPD. Interlaminar shear strength of the resulting composite as measured by the short-beam shear test (ASTM-D-2344) was found to be 2,538±45 psi.

Example 11

Poly-DCPD Composite Panel with Norbornene-Based, Metathesis-Active Silane-Treated Volan-Sized Fabric A preform was impregnated as in Example 9, but in this case, the oven dried fabric was further pre-treated as follows: A solution of the norbornene-based coupling agent prepared as in Example 1 was loaded into a 12 L round-bottom flask equipped with a Schott flange that had been dried 2 h at 120° C., then fitted with a gas inlet supplied with dry argon gas and cooled while flowing the dry gas through the vessel. The solution was diluted with ~350 mL of Aldrich Anhydrous Grade toluene, and the preform plies were soaked in this solution for approximately 5 minutes. The sizing solution was then poured off and the plies were rinsed (ca. 1 min. per aliquot) with 3×100 mL toluene followed by 3×100 mL acetone. Finally, the plies were dried in a 40° C. oven for 15 h before being stored in a sealed, polyethylene bag for several weeks before impregnation. The interlaminar shear strength of the resulting composite as measured by the short-beam shear test (ASTM-D-2344) was found to be 3,090±288 psi.

What is claimed is:

1. An adhesion agent composition for coating a substrate surface, said composition comprising:
   at least one $C_3$-$C_{200}$ olefin compound having at least one metathesis active double bond, wherein the olefin is substituted with a first moiety selected from the group consisting of thiol, thioether, ketone, aldehyde, ester, ether, amine, amide, nitro, carboxylic acid, disulfide, carbonate, isocyanate, phosphate, phosphite, sulfate, sulfite, sulfonyl, carbodiimide, carboalkoxy, carbamate, halogen, and pseudohalogen;
   at least one compatibilizing functionality for interacting with the substrate surface; and
   a ruthenium or osmium carbene metathesis catalyst.

2. The composition of claim 1 wherein the substrate surface is selected from the group consisting of silicate glasses, silicate minerals, metals, metal alloys, ceramics, natural stones, plastics, carbon, silicon, and semiconductors.

3. The composition of claim 1 wherein the substrate surface is native or functionalized.

4. The composition of claim 1 wherein the olefin is selected from the group consisting of substituted norbornenes, substituted cyclopropenes, substituted cyclobutenes, substituted benzocyclobutenes, substituted cyclopentenes, substituted cyclopentadiene oligomers, substituted cyclohexenes, substituted cycloheptenes, substituted cyclooctenes, substituted cyclooctadienes, substituted norbornadienes, substituted [2.2.1]bicycloheptenes, substituted [2.2.2]bicyclooctene, substituted cyclohexenylnorbornenes, and substituted norbornene dicarboxylic anhydrides.

5. The composition of claim 4 wherein the olefin is substituted dicyclopentadiene.

6. The composition of claim 1 wherein the olefin is cyclic or multicyclic.

7. The composition of claim 1 wherein the olefin is substituted with a second moiety selected from the group consisting of $C_1$-$C_{20}$ alkyl, aryl, acyl, $C_1$-$C_{20}$ alkoxide, aryloxide, $C_3$-$C_{20}$ alkyldiketonate, aryldiketonate, $C_1$-$C_{20}$ carboxylate, arylsulfonate, $C_1$-$C_{20}$ alkylsulfonate, $C_1$-$C_{20}$ alkylthio, arylthio, $C_1$-$C_{20}$ alkylsulfonyl, and $C_1$-$C_{20}$ alkylsulfinyl, wherein the moiety is substituted or unsubstituted.

8. The composition of claim 1 wherein at least one carbon in the olefin is replaced by a group selected from the group consisting of silicon, oxygen, sulfur, nitrogen, phosphorus, antimony, and boron.

9. The composition of claim 1 wherein the compatibilizing functionality is prepared from a group selected from the group consisting of metal halides, silyl halides, $C_1$-$C_{20}$ alkyls, ethers, esters, organic and mineral acids and their halides, aldehydes, boranes, alanes, alkoxides, amines, amides, phosphines, phosphides, carboxylates, thioethers, alcohols, sulfonates, sulfonyls, ammonium, phosphonium, alkyl phosphine oxides, and aryl phosphine oxides.

10. The composition of claim 1 wherein the compatibilizing functionality and the olefin are the same compound.

11. The composition of claim 1 wherein the compatibilizing functionality is a silane prepared by contacting silicon halide or silyl ether with one or more nucleophilic reagents selected from the group consisting of water, alcohol, amine, amide, phosphine, phosphide, carbanion, and alkoxide.

12. The composition of claim 1 wherein the olefin is a norbornene and the compatibilizing functionality is —$SiCl_x(ER_y)_{3-x}$, wherein x is in a range of 0 to 3, E is selected from the group consisting of carbon, silicon, nitrogen, phosphorus, antimony, and oxygen, and y is in The range of 1-3; and R is $C_1$-$C_{20}$ alkyl or aryl, wherein R is substituted or unsubstituted.

13. The composition of claim 1 wherein the substrate surface is selected from the group consisting of fibrous surfaces, woven surfaces, microparticulate surfaces, glass surfaces, ceramic surfaces, metal surfaces, carbon surfaces, polymer surfaces, and semiconductor surfaces.

14. An adhesion agent composition for coating a substrate surface, said composition comprising:
   at least one $C_3$-$C_{200}$ olefin compound having at least one metathesis active double bond, wherein the olefin is 5-norbornene-2-methoxy; and
   at least one compatibilizing functionality for interacting with the substrate surface, wherein the compatibilizing functionality is —$SiCl_x(ER)_{3-x}$, wherein x is 0 or 3, E is oxygen, and R is methyl or ethyl, and a ruthenium or osmium carbene metathesis catalyst.

15. An adhesion agent composition for coating a substrate surface, said composition comprising:
   at least one $C_3$ $C_{200}$ olefin compound having at least one metathesis active double bond, wherein the olefin is substituted or unsubstituted; and
   at least one compatibilizing functionality for interacting with the substrate surface, wherein the compatibilizing functionality is a silsesquioxane, and a ruthenium or osmium carbene metathesis catalyst.

* * * * *

UNITED STATES PATENT AND TRADEMARK OFFICE
CERTIFICATE OF CORRECTION

| | | |
|---|---|---|
| PATENT NO. | : 7,339,006 B2 | Page 1 of 1 |
| APPLICATION NO. | : 10/178373 | |
| DATED | : March 4, 2008 | |
| INVENTOR(S) | : Michael A. Giardello and Christopher M. Haar | |

It is certified that error appears in the above-identified patent and that said Letters Patent is hereby corrected as shown below:

On title page, item 73 Assignee:
replace "Cymetech, L.L.C., Monroe, LA (US)"
with --Materia, Inc., Pasadena, CA (US)--.

Signed and Sealed this
Twenty-second Day of March, 2016

Michelle K. Lee
*Director of the United States Patent and Trademark Office*